March 24, 1970     B. C. COAD     3,502,499
CLADDING METHOD AND APPARATUS

Filed May 22, 1967     2 Sheets-Sheet 1

Brian C. Coad,
Inventor.
Koenig, Senniger,
Powers and Leavitt,
Attorneys.

March 24, 1970 B. C. COAD 3,502,499
CLADDING METHOD AND APPARATUS
Filed May 22, 1967 2 Sheets-Sheet 2

United States Patent Office 3,502,499
Patented Mar. 24, 1970

3,502,499
CLADDING METHOD AND APPARATUS
Brian C. Coad, Fairfield, England, assignor to Texas Instruments Incorporated, Dallas, Tex., a corporation of Delaware
Filed May 22, 1967, Ser. No. 640,248
Int. Cl. C23c 13/02, 13/10
U.S. Cl. 117—101                 4 Claims

ABSTRACT OF THE DISCLOSURE

This disclosure relates to the coating or cladding of a continuous length of substrate material from a centrifugal type of evaporator and condensation onto the substrate. A bath of the coating material is maintained continuously molten in the centrifugal evaporator and is evaporated therefrom by electron beam heating. A preheated length of the substrate is moved axially through the centrifugal evaporator. Vapor condenses on the moving substrate to form a dense, even coating. The evaporator and electron beam apparatus are located in a vacuum chamber having inlet and outlet seals. The substrate is preheated to a temperature suitable to ensure that the coating is ductile, dense, and fully adherent to the substrate. The coating thickness is controlled by varying the speed at which the substrate passes through the evaporator (i.e., the time of exposure to the vapor) or by varying the power input to the evaporator (i.e., the rate of evaporation) or both. After the substrate is coated, it may be quenched by passing it through a bath of a suitable material or through other suitable cooling means.

---

The general field of the invention is that of coating or cladding a length of substrate which may be round, rectangular or of other cross-sectional form. However, the invention is most useful on round substrate material, such as wires, rods and tubes, because a round shape is one which heretofore has been the most difficult to clad evenly.

In particular, cladding metal substrates with titanium or other of the so-called reactive metals presents grave problems, although the products are highly regarded because of the excellent corrosion resistance of the cladding and their low cost. Electroplating is possible only with fused salts, and the method is not fully developed. Chemical vapor deposition processes are feasible but expensive. Hot solid-phase bonding is sometimes difficult because of the high affinity for oxygen and nitrogen of many materials. Cold solid-phase bonding has been used but it presents difficulties on round sections and is sometimes practically impossible to use because of the incompatibility between the substrate and the cladding.

A centrifugal evaporator heated by electron beams in a vacuum is known for condensation in a different manner on flat plates, but it does not solve the problem of evenly coating continuous lengths of a substrate, particularly when of round cross section such as wire, rod or tubing.

Briefly, the invention comprises forming an evaporating melt of coating material. The pool formed by the melt surrounds an opening therethrough. A length of substrate material to be coated is moved through the opening. The vapor from the melt is condensed upon the moving substrate. Preheating of the substrate ensures adhesion, ductility, and density of the coating. After the condensate has formed on the substrate, both may be cooled.

Figure 1:
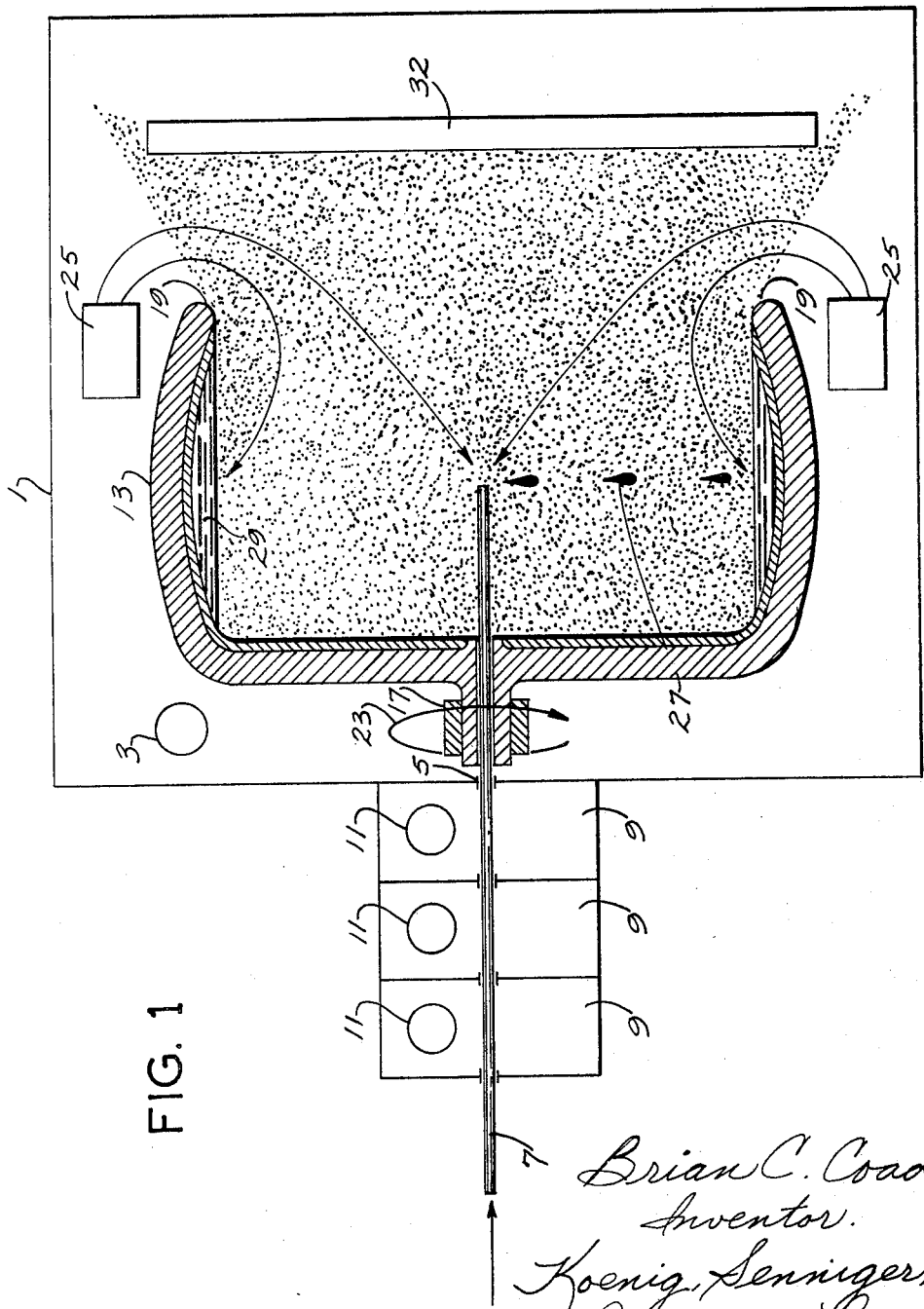
Figure 2:
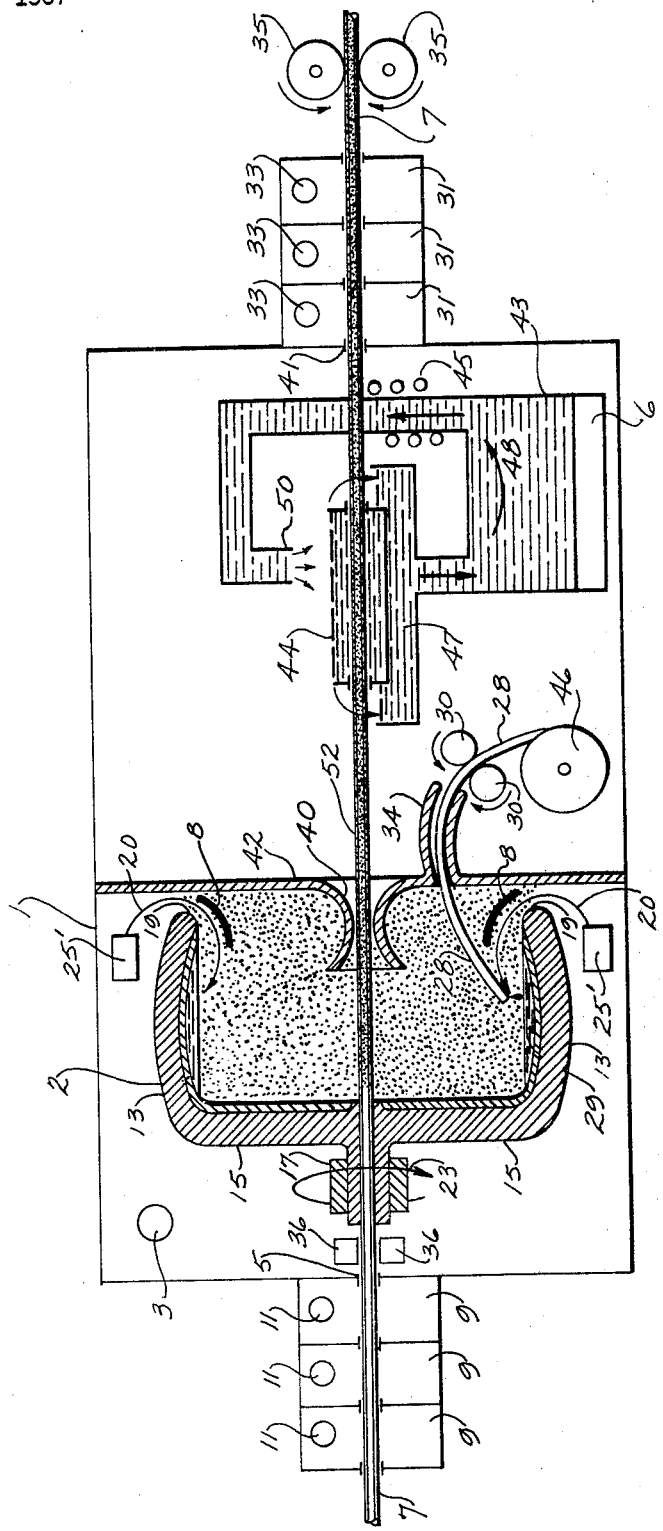

FIG. 1 is a schematic axial section showing known centrifugal evaporator apparatus; and FIG. 2 is a schematic axial section of preferred apparatus made according to the invention.

Corresponding reference characters indicate corresponding parts throughout the drawings.

Apparatus heretofore known to me is shown in FIG. 1. This is shown to illustrate the point of departure of the invention to be described below. Referring to FIG. 1, there is shown at numeral 1 a vacuum chamber which is evacuated through an opening 3. The chamber has an inlet 5 through which material 7 is introduced through a series of differentially pumped seals 9, these being pumped out through ports 11. Within the chamber 1 is a centrifugal evaporator or centrifuge comprising a rotatable hollow cylinder or drum 13 which is commonly made of water-cooled copper. The known water-cooling arrangement is not shown. This centrifuge is suitably mounted for rotation within the chamber and has its axis horizontal or near horizontal, the cylinder being closed at one end 15 and open at the other end 19. It is carried on a hollow shaft 21 rotatable in a suitable bearing 17. The cooling of the centrifuge walls 13 and 15 produces a solid skull 2 of the coating material within the centrifuge. Drive means for high-speed rotation is indicated by the dart 23. At numerals 25 are shown several stationary electron beam guns. Two of them are shown, although there may be other numbers of them such as three, four or more. These guns include conventional means (not shown) for guiding the beams through the opening 19 onto the incoming end of the substrate 7 to melt it, as indicated by the drops 27. These collect and form an annular pool 29 in the centrifuge 13 as it spins. The guns 25 not only melt the material to supply the annular melt 29 but in addition evaporate material from this melt to form a gaseous vapor, as indicated by the stippling. The vapor escapes through the opening 19 for impingement upon a plate 32 mounted in the chamber 1 to be coated. The vapor condenses on the surface of the plate 32 so as to provide the desired coating thereon.

Referring to FIG. 2, which illustrates a preferred form of the invention, there are shown certain parts which are like those of the prior apparatus of FIG. 1, like numerals designating like parts. However, in this case the substrate 7, drawn by rolls 35, is not allowed to become melted by the action of the electron guns 25'. Their electron beams 20 are guided to impinge only upon material in the drum 13 which is being spun, substantially without impingement upon the substrate 7. Guide means are diagrammatically indicated at 8. The supply of coating material is, for example, provided in wire form 28 and is moved by rolls 30 from a coil 46 mounted within vacuum chamber 1 through a guide 34. Alternatively the coil 46 may be mounted outside vacuum chamber 1 and fed through pumped seals similar to those shown at 9 through which the substrate 7 enters the chamber. Rolls 35 draw the substrate 7 out of chamber 1 through pumped seals 31 which are differentially pumped out through openings 33.

The substrate 7 is not melted in its passage through the centrifuge 13 and chamber 1. The guns 25 provide only for melting and evaporating the material in the centrifuge 13. As the substrate 7 enters the vacuum chamber 1 it is preheated by means of a heater 36. It then passes through the centrifuge 13, where it is coated, then through a horn 40 of a vapor shield 42, which collects excess vapor escaped from the evaporator 13. The coating solidifies at 52 after which the coated substrate passes to a temperature-reducing system 43, 44 where it is cooled by a liquid heat-exchange medium 48. The requirements of this heat-exchange medium are that it should have a low vapor pressure and it should not erode, corrode or otherwise contaminate the coating on substrate 7. A preferred cooling system using a liquid metal of low melting point and low vapor pressure such as gallium or tin is shown in FIG. 2. The liquid metal cooling medium is contained in reservoir 43 which is attached to a heat exchanger 6 to maintain the correct metal temperature for cooling. From reservoir 43 liquid metal is circulated by electromagnetic pump 45 to a weir-type reservoir 44 through which coated substrate 7 passes completely submerged in molten metal. Excess molten metal overflows from weir reservoir 44 into reservoir 47 from whence it is returned through outlet 50 to reservoir 43 for cooling and recirculation.

Although a molten metal of low melting temperature such as tin or gallium is the preferred coolant for cladding materials which condense at high temperatures, such as titanium, other coolants such as low vapor pressure organic materials may be used for some cladding materials. Other coolant pumping means may then be employed.

Alternatively, other cooling means such as a circuitous path over cooling rolls or the like may be employed. In addition, it will be understood that while a cooling system such as described is preferable, in some applications it may not be necessary.

Operation according to the invention is as follows, referring to FIG. 2:

The chamber 1 is evacuated. The substrate material 7 is drawn through the apparatus to the right by means of the rolls 35. The pumped seals at the inlet 5 and the outlet 41 are also evacuated to prevent undue leakage of air into the chamber. As the substrate 7 enters the chamber 1 it is preheated by the heater 36. The cladding material in the wire form 28 is fed into the centrifuge 13 from coil 46. The electron beam guns 25 melt this material to form the annular melt pool 29 under centrifugal force. The guns also cause gaseous evaporation from this pool, as indicated by the stippling. The evaporated material surrounds and condenses and solidifies upon the cooler substrate as it moves at 52. The coating thickness is controlled by varying the speed of substrate 7 or by varying the power applied to electron beam guns 25.

While it might be possible at this stage to draw the core out of the chamber 1 it is generally so hot that problems may occur in moving it through the vacuum seals 31. Therefore the container 43 is provided which contains the melt of gallium, tin or like coolant to reduce the temperature of the clad substrate to a value that it can be handled in the vacuum sealing means 31 beyond the outlet 41.

While an important advantage of the invention is to enable one evenly to coat a wire, rod, tube or the like around its entire external cylindrical surface, the invention is also useful for coating substrates of other cross sections. To accomplish this, the inlets and the outlets of the chamber 1 and of the vacuum seals are designed with sufficient inside diameters to pass the core.

While in the above example metallic substrate and cladding materials have been described, it will be understood that either or both the substrate and the cladding may be composed of nonmetallic material.

In view of the above, it will be seen that the several objects of the invention are achieved and other advantageous results attained.

I claim:
1. The method of coating a length of a substrate material, comprising forming a rotating annulus of a melt of a coating material, moving a length of a substrate material through the rotating annulus, and generating and directing an electron beam to impinge substantially solely upon said melt, substantially without impingement upon said substrate material as said substrate material is passed through the rotating annulus so as to form a vapor for condensation on said moving substrate material as it emerges from the annulus.

2. The method according to claim 1 wherein said substrate material is preheated prior to passage through the rotating annulus so as to improve adhesion of the vapor thereto and said substrate material is cooled by passing through a reservoir of a preselected molten metal subsequent to emergence from the annulus.

3. Apparatus for coating a length of a substrate material comprising a vacuum chamber, a centrifuge in said chamber having on its center line of rotation an inlet and an opposite outlet, means for moving substrate material through the centrifuge via said inlet and outlet, means for feeding cladding material into the centrifuge, said centrifuge supporting the cladding material being fed thereto, electron beam generating and guide means mounted in the chamber to direct electrons substantially solely onto said cladding material supported in the centrifuge to melt and evaporate the cladding material therein substantially without impingement upon the substrate as the moving substrate passes between said inlet and outlet, whereby the centrifuge forms an evaporating annulus of the melt continuously surrounding the moving substrate, the vapor from the annulus condensing on and solidly coating the substrate during its passage between said inlet and outlet.

4. Apparatus made according to claim 4, including cooling means within the chamber for cooling the solidly coated core material before its exit from the chamber, said cooling means comprising a reservoir of a preselected molten metal through which the coated core material is transferred, said reservoir being supported within said chamber adjacent the outlet of said centrifuge.

References Cited

UNITED STATES PATENTS

| 2,384,500 | 9/1945 | Stoll | 117—107.1 |
| 3,019,129 | 1/1962 | Walsh | 117—101 |
| 3,043,715 | 7/1962 | Clough | 117—107.1 X |
| 3,128,205 | 4/1964 | Illsley | 118—49 |
| 3,329,524 | 7/1967 | Smith | 117—107 |
| 3,360,600 | 12/1967 | Du Bois | 118—49.1 X |

ANDREW G. GOLIAN, Primary Examiner

U.S. Cl. X.R.

117—10.6, 107.1, 119.4; 118—49.5, 69